US012763819B2

(12) United States Patent
Shabara et al.

(10) Patent No.: US 12,763,819 B2
(45) Date of Patent: Oct. 13, 2026

(54) METHOD AND APPARATUS FOR UPLINK SIGNAL PRECODING AND REPORTING

(71) Applicant: MEDIATEK INC., Hsinchu City (TW)

(72) Inventors: Yahia Ahmed Mahmoud Mahmoud Shabara, San Jose, CA (US); Sriharsha Ramarao Magani, Bengaluru KA (IN); Parisa Cheraghi, San Jose, CA (US)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/851,162

(22) PCT Filed: Apr. 19, 2023

(86) PCT No.: PCT/CN2023/089178
§ 371 (c)(1),
(2) Date: Sep. 26, 2024

(87) PCT Pub. No.: WO2023/202609
PCT Pub. Date: Oct. 26, 2023

(65) Prior Publication Data

US 2025/0175222 A1 May 29, 2025

(30) Foreign Application Priority Data

Apr. 21, 2022 (IN) ............................. 202221023643

(51) Int. Cl.
*H04B 7/0452* (2017.01)
*H04B 7/0456* (2017.01)

(52) U.S. Cl.
CPC .................................. *H04B 7/0456* (2013.01)

(58) Field of Classification Search
CPC .. H04B 7/0456; H04B 7/0404; H04B 7/0639; H04B 7/0486; H04B 7/0626;
(Continued)

(56) References Cited

U.S. PATENT DOCUMENTS 9,559,759 B2 1/2017 Taherzadeh Boroujeni
10,819,412 B2 10/2020 Park
(Continued)

FOREIGN PATENT DOCUMENTS

CN 107210803 A 9/2017
CN 107925466 A 4/2018
(Continued)

OTHER PUBLICATIONS

International Search Report and Written Opinion dated Jun. 25, 2023, issued in application No. PCT/CN2023/089178.
(Continued)

*Primary Examiner* — Eva Y Puente
(74) *Attorney, Agent, or Firm* — McClure, Qualey & Rodack, LLP

(57) ABSTRACT

This disclosure provides an apparatus including processing circuitry that divides a plurality of antenna ports of the apparatus into multiple antenna groups. Each antenna group includes one or more antenna ports that are coherent to each other within the respective group. The antenna ports from different groups are not coherent to each other. The processing circuitry determines, for each antenna group, one or more layers to be transmitted by the respective antenna group. The processing circuitry selects, for each antenna group, one of a plurality of precoder submatrices based on a number of the one or more antenna ports included in the respective antenna group and a number of the one or more layers to be transmitted by the respective antenna group. The processing circuitry constructs one or more precoder matrices for the plurality of antenna ports based on one or more combinations of the selected precoder submatrices.

18 Claims, 12 Drawing Sheets

(58) Field of Classification Search
CPC .. H04B 7/0426; H04B 7/0691; H04B 7/0628; H04B 7/063; H04B 7/0617; H04B 7/0413; H04B 7/0478; H04B 7/024; H04L 5/0048; H04L 5/0051; H04L 5/0053; H04L 5/0094; H04L 5/0023; H04L 5/0044; H04L 5/00; H04L 25/0226; H04L 5/0007; H04L 5/0091; H04L 25/0224; H04L 5/001; H04L 5/0035; H04W 52/146; H04W 72/23; H04W 52/367; H04W 52/42; H04W 72/1268; H04W 72/21; H04W 8/24; H04W 72/232; H04W 52/325; H04W 72/0473; H04W 52/346; H04W 24/10
See application file for complete search history.

(56) References Cited

U.S. PATENT DOCUMENTS 11,316,566 B2 4/2022 Park
2006/0098568 A1 5/2006 Oh
2014/0328425 A1* 11/2014 Li ........................ H04B 7/0478 375/267
2016/0323022 A1* 11/2016 Rahman ............... H04B 7/0479
2018/0323854 A1* 11/2018 Yang ................... H04L 25/0226
2020/0275260 A1 8/2020 Huang
2021/0013936 A1 1/2021 Zhu
2021/0336667 A1* 10/2021 Bengtsson ........... H04B 7/0691
2022/0149906 A1* 5/2022 Rupasinghe ......... H04B 7/0689
2023/0156657 A1* 5/2023 Huang .................... H04W 4/02 455/456.1
2025/0266920 A1* 8/2025 Kheirkhah Sangdeh .................... H04B 17/3913

FOREIGN PATENT DOCUMENTS

CN 108028684 A 5/2018
CN 110100407 A 8/2019
WO 2015022170 A1 2/2015

OTHER PUBLICATIONS

Extended European Search Report dated Mar. 16, 2026, issued in application No. EP 23791264.7.

* cited by examiner

METHOD AND APPARATUS FOR UPLINK SIGNAL PRECODING AND REPORTING

INCORPORATION BY REFERENCE

This present disclosure claims the benefit of India application No. 202221023643, filed on Apr. 21, 2022, which is incorporated herein by reference in its entirety.

TECHNICAL FIELD

The present disclosure relates to wireless communications, and specifically to a procedure for uplink signal precoding and reporting.

BACKGROUND

In wireless communications, channel state information (CSI) can be used for estimating channel properties of a communication link between a transmitter and a receiver. In related arts, the receiver can estimate the CSI of the communication link and feedback the raw CSI to a transmitter. This procedure can consume a great deal of communication resources and place a tremendous strain on a wireless network using modern multiple-input and multiple-output (MIMO) technology.

SUMMARY

Aspects of the disclosure provide a method for wireless communication at an apparatus. Under the method, a plurality of antenna ports of the apparatus is divided into multiple antenna groups each including one or more antenna ports that are coherent to each other within the respective group. The antenna ports from different groups are not coherent to each other. For each antenna group, one or more layers to be transmitted by the respective antenna group are determined, and one of a plurality of precoder submatrices is selected based on a number of the one or more antenna ports included in the respective antenna group and a number of the one or more layers to be transmitted by the respective antenna group. One or more precoder matrices are constructed for the plurality of antenna ports based on one or more combinations of the selected precoder submatrices.

In an embodiment, a number of rows of each selected precoder submatrix corresponds to the number of the one or more antenna ports included in the antenna group corresponding to the respective selected precoder submatrix.

In an embodiment, a number of columns of each selected precoder submatrix corresponds to the number of the one or more layers to be transmitted by the antenna group corresponding to the respective selected precoder submatrix.

In an embodiment, columns of each of the plurality of precoder submatrices are discrete Fourier transform (DFT) beams.

In an embodiment, each DFT beam is a Kronecker product of a horizontal beam and a vertical beam.

In an embodiment, the DFT beams in each column are co-phased within the respective column.

In an embodiment, a first subset and a second subset of the plurality of precoder submatrices correspond to a first number of layers and a second number of layers. In an example, the first number is not equal to the second number. In an example, the first number is equal to the second number.

In an embodiment, a first oversampling factor and a second oversampling factor are used for the first subset and the second subset of the plurality of precoder matrices, respectively. In an example, the first oversampling factor is not equal to the second oversampling factor. In an example, the first oversampling factor is equal to the second oversampling factor.

In an embodiment, a first DFT beam and a second DFT beam respectively corresponding to a first column and a second column of one of the plurality of precoder submatrices are adjacent beams.

In an embodiment, channel state information is generated based on one of the one or more constructed precoder matrices.

Aspects of the disclosure provide an apparatus including processing circuitry that divides a plurality of antenna ports of the apparatus into multiple antenna groups each including one or more antenna ports that are coherent to each other within the respective group. The antenna ports from different groups are not coherent to each other. The processing circuitry determines, for each antenna group, one or more layers to be transmitted by the respective antenna group, and selects, for each antenna group, one of a plurality of precoder submatrices based on a number of the one or more antenna ports included in the respective antenna group and a number of the one or more layers to be transmitted by the respective antenna group. The processing circuitry constructs one or more precoder matrices for the plurality of antenna ports based on one or more combinations of the selected precoder submatrices.

In an embodiment, a number of rows of each selected precoder submatrix corresponds to the number of the one or more antenna ports included in the antenna group corresponding to the respective selected precoder submatrix.

In an embodiment, a number of columns of each selected precoder submatrix corresponds to the number of the one or more layers to be transmitted by the antenna group corresponding to the respective selected precoder submatrix.

In an embodiment, columns of each of the plurality of precoder submatrices are discrete Fourier transform (DFT) beams.

In an embodiment, each DFT beam is a Kronecker product of a horizontal beam and a vertical beam.

In an embodiment, the DFT beams in each column are co-phased within the respective column.

In an embodiment, a first subset and a second subset of the plurality of precoder submatrices correspond to a first number of layers and a second number of layers. In an example, the first number is not equal to the second number. In an example, the first number is equal to the second number.

In an embodiment, a first oversampling factor and a second oversampling factor are used for the first subset and the second subset of the plurality of precoder matrices, respectively. In an example, the first oversampling factor is not equal to the second oversampling factor. In an example, the first oversampling factor is equal to the second oversampling factor.

In an embodiment, a first DFT beam and a second DFT beam respectively corresponding to a first column and a second column of one of the plurality of precoder submatrices are adjacent beams.

In an embodiment, the processing circuitry generates channel state information based on one of the one or more constructed precoder matrices.

Aspects of the disclosure provide a non-transitory computer-readable medium storing instructions which when executed by an apparatus cause the apparatus to perform any one or a combination of the above methods.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
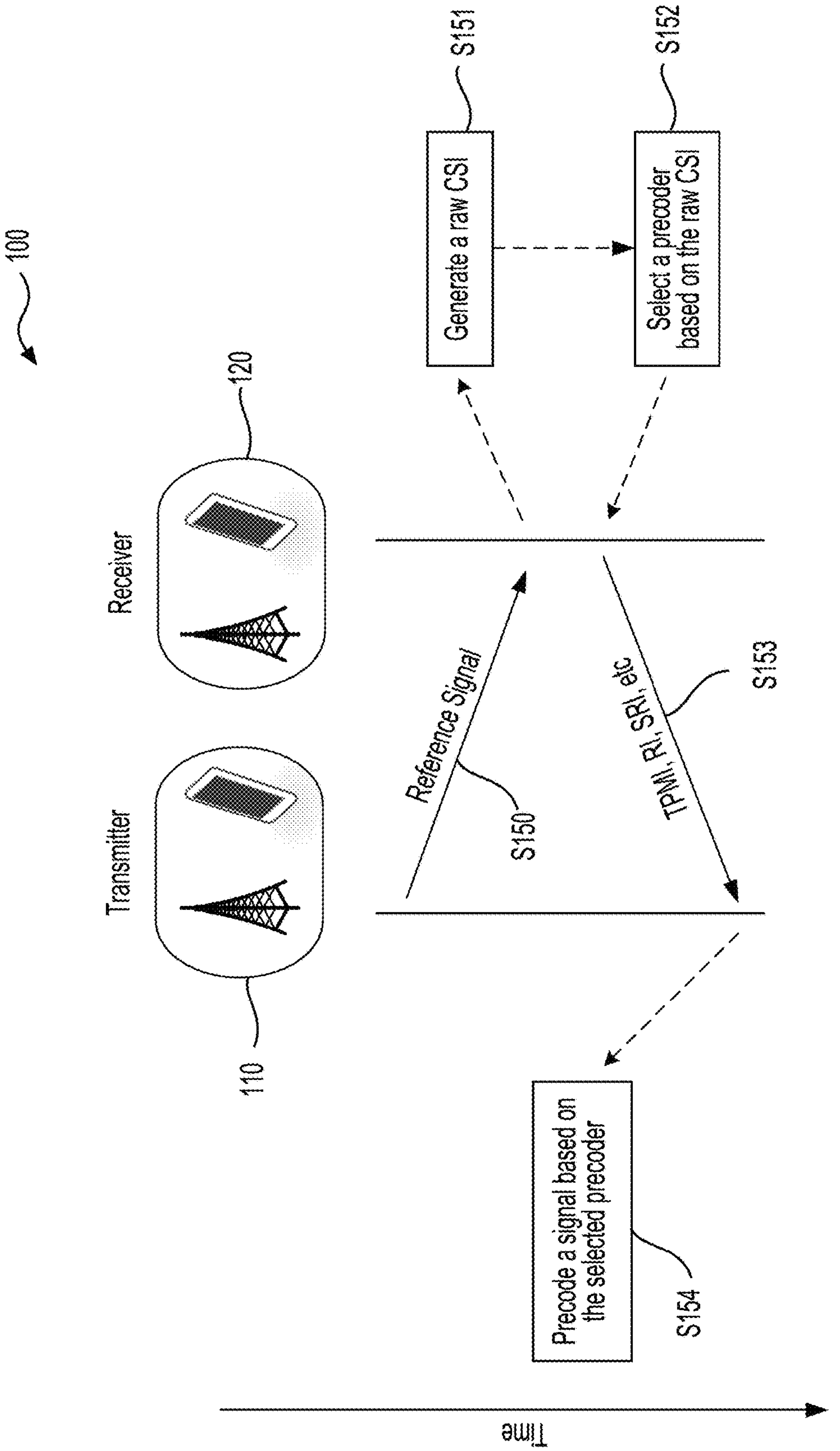
FIG. 1 shows an exemplary procedure of CSI feedback according to embodiments of the disclosure.

The detailed description set forth below in connection with the appended drawings is intended as a description of various configurations and is not intended to represent the only configurations in which the concepts described herein may be practiced. The detailed description includes specific details for the purpose of providing an understanding of various concepts. However, these concepts may be practiced without these specific details.

Several aspects of telecommunication systems will now be presented with reference to various apparatuses and methods. These apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

In wireless communications, channel state information (CSI) can be used for estimating channel properties of a communication link between a transmitter and a receiver. For example, CSI can describe how a signal propagates from the transmitter to the receiver, and represent a combined effect of phenomena such as scattering, fading, power loss with distance, and the like. Thus, CSI can also be referred to as channel estimation. CSI can make it feasible to adapt the transmission between the transmitter and the receiver to current channel conditions, and thus is a critical piece of information that needs to be shared between the transmitter and the receiver to allow high-quality signal reception.

In an example, the transmitter and the receiver (or transceivers) can rely on CSI to compute their transmit precoding and receive combining matrices, among other important parameters. Without CSI, a wireless link may suffer from a low signal quality and/or a high interference from other wireless links.

To estimate CSI, the transmitter can send a predefined signal to the receiver. That is, the predefined signal is known to both the transmitter and the receiver. The receiver can then apply various algorithms to perform CSI estimation. At this stage, CSI is known to the receiver only. The transmitter can rely on feedback from the receiver for acquiring CSI knowledge.

Raw CSI feedback, however, may require a large overhead which may degrade the overall system performance and cause a large delay. Thus, the raw CSI feedback is typically avoided. Alternatively, from CSI, the receiver can extract some important or necessary information for the transmitter operations, such as a transmit precoder matrix indicator (TPMI), precoding weights, a rank indicator (RI), a channel quality indicator (CQI), a modulational and coding scheme (MCS), a sounding reference signal indicator (SRI), and the like. The extracted information can be much smaller than the raw CSI, and the receiver can only feedback these small pieces of information to the transmitter, striking a balance between feedback overhead and achievable performance.

FIG. 1 shows an exemplary procedure 100 of CSI feedback according to embodiments of the disclosure. In the procedure 100, each of a transmitter 110 and a receiver 120 can be a user equipment (UE) or a base station (BS).

At step S150, the transmitter 110 can transmit a reference signal (RS) to the receiver 120. The RS is also known to the receiver 120 before the receiver 120 receives the RS. In an embodiment, the RS can be specifically intended to be used by devices to acquire CSI and thus is referred to as CSI-RS.

At step S151, after receiving the CSI-RS, the receiver 120 can generate a raw CSI by analyzing the received CSI-RS using the transmitted CSI-RS that is already known to the receiver 120.

At step S152, the receiver 120 can select a best transmit precoder from a predefined codebook of precoders based on the raw CSI.

At step S153, the receiver 120 can send a TPMI of the selected precoder back to the transmitter 110, along with relevant information such as CQI, RI, MCS, SRI, and the like.

At step S154, after receiving the TPMI and the relevant information, the transmitter 110 can determine transmission parameters and pre-code a signal based on the selected precoder indicated by the PMI.

In related arts such as 3GPP TS 38.211 and TS 38.214 Release 17, uplink (UL) can support up to 4 transmitting (TX) ports (or up to 4-layer transmission), which is less than that of downlink (DL) capability that can support up to 32 receiving (RX) ports (or up to 8-layer transmission). Thus, there is an imbalance between the DL and UL achievable performances.

In order to balance the DL and UL performances, more than 4 TX ports should be supported for a user equipment (UE). For example, a UE with a large physical volume, such as a customer premise equipment (CPE), a fixed wireless access (FWA) device, a vehicle, and the like, can support up to 8 TX ports. However, support for more than 4 TX ports, in particular 8 Tx ports, is lacking in 5G network designs in the related arts. In 3GPP TS 38.211 and TS 38.214 Release 17, the UL precoding codebook is limited to 4 TX ports. Thus, to support more than 4 TX ports at a UE, the UL precoding codebook needs to be modified or extended.

This disclosure provides methods and embodiments of modifying the UL precoding codebooks to support more than 4 TX ports.

According to aspects of the disclosure, a UE can be classified into one of three categories for codebook-based pre-coded transmission based on a capability of the UE to handle a phase coherence among antenna ports of the UE. The first category can be referred to as fully coherent mode, in which a UE can control a relative phase coherence among all antenna ports of the UE that are used for transmission. The second category can be referred to as partially coherent mode, in which a UE can control a relative phase coherence among a subset of antenna ports of the UE that are used for transmission, e.g., pairwise coherence is maintained. The third category can be referred to as non-coherent mode, i.e., no coherence can be maintained across any pair of antenna ports of a UE.

The codebooks corresponding to the fully coherent mode can allow a linear combination of data input over all antenna ports. The codebooks corresponding to the partially coherent mode can allow a linear combination within subsets of the antenna ports which offer coherence and with a selection among the subsets. The codebooks corresponding to the non-coherent mode are limited to antenna-port selections as no coherence can be offered among the antenna ports.

The UL codebook designs in the related arts, such as Tables 6.3.1.5-1 to 6.3.1.5-7 in 3GPP TS 38.211, which support up to 4-layer transmission and are referred to as legacy codebooks, are tabulated for UL transmission and classified according to the coherence mode. For 8 TX antenna ports, instead of listing all possible precoder choices in Tables, a comprehensive mathematical formula can be used to define the UL codebooks. For example, the UL codebooks can be defined such that a precoder matrix has co-phased discrete Fourier transform (DFT) beams as columns of the matrix, similar to Type-I single-panel (SP) DL codebooks. The UL codebooks can be a superset of, equal to, or a subset of Type I SP DL codebooks, and should support the following capabilities: (i) various antenna array configurations; (ii) a number of layers $\ell$ such that $1\leq\ell\leq 8$; and (iii) various coherence assumptions for TX ports, including non-coherent, partially coherent, and fully coherent.

UL Codebooks for Fully Coherent Mode

Figure 2:
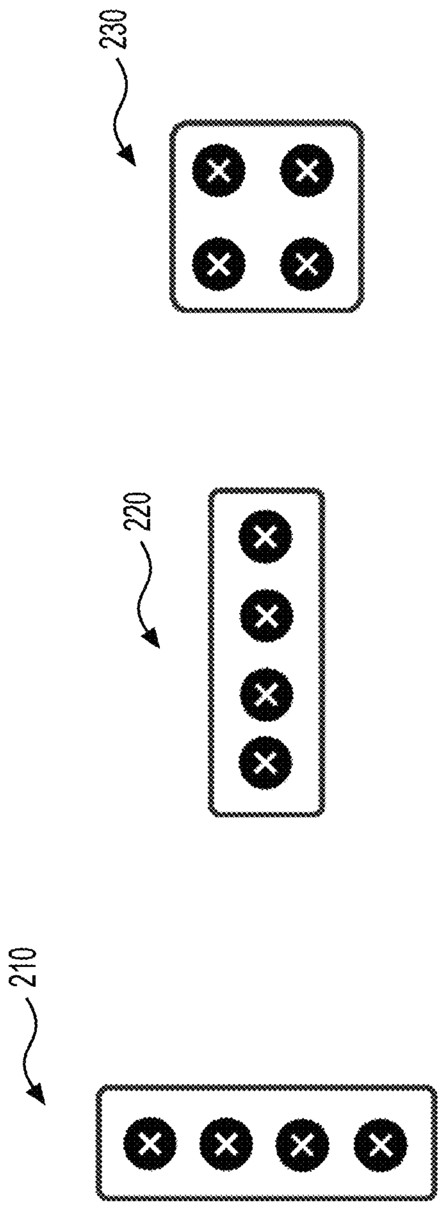
FIG. 2 shows three exemplary antenna array configurations according to embodiments of the disclosure.

FIG. 2 shows three exemplary antenna array configurations according to embodiments of the disclosure. In FIG. 2, the antenna arrays can be denoted as $N_1 \times N_2$ cross-polarized antennas each having a first polarization and a second polarization, where $N_1$ and $N_2$ represent numbers of horizontally and vertically placed cross-polarized antennas, respectively. For example, the antenna arrays 210-230 can be denoted as a 1×4, 4×1, and 2×2 antenna arrays, respectively.

According to aspects of the disclosure, a generalized precoder matrix with co-phased DFT beams as columns can be expressed as $$W = \begin{pmatrix} v_1 & v_2 & \dots & v_L \\ e^{j\Phi_1} v_1 & e^{j\Phi_2} v_2 & \dots & e^{j\Phi_L} v_L \end{pmatrix}$$

where L is a number of layers, $v_i$ is a DFT beam of a first polarization on layer i, $e^{j\Phi_i}v_i$ is a DFT beam of a second polarization on layer i, and $\Phi_i$ is a co-phasing value of the second polarization on layer i.

To indicate a specific matrix W, only the DFT beams $v_i$ and the co-phasing values $\phi_i$ need to be specified. The DFT beams $v_i$ and the co-phasing values $\phi_i$ can take values from predefined sets. The predefined sets can be dependent on a number of layers (rank-dependent). Structure for the relationship between $v_1, \dots, v_L$ and $\phi_1, \dots, \phi_L$ can be specified to further restrict the number of choices for the precoder W and lower the feedback overhead needed to indicate TPMI.

For the fully coherent mode, the DFT beams $v_i$ can be oversampled with oversampling factors $(O_1, O_2)$, where $O_1$ and $O_2$ are used to increase the DFT beam resolution in horizontal and vertical directions, respectively. The oversampling factor O (either $O_1$ or $O_2$) can be configured with values in {1, 2, 3, 4, . . . }, where a value of 1 has a smallest overhead and a coarse resolution, and a value of 4 has a resolution that matches that of the Type I SP DL codebook. Define $$\alpha_N^q$$

to be a set of all DFT beams of size N with an oversampling offset $q \in \{0, 1, \dots, O-1\}$. The overhead and performance can be balanced by restricting the choices of the DFT beams $v_i$ such that $$v_i \in \bigcup_q \beta_N^q \subseteq \bigcup_q \alpha_N^q, \text{ where } \beta_N^q$$

is a subset of all possible choices in $$\alpha_N^q.$$

For example, when the oversampling factor 0>3, by restricting the oversampling offset q to 2 can result in a subset of choices. With a reduced oversampling offset, the number of possible beam choices can be reduced, which can further help in reducing the feedback overhead from a receiver to a transmitter. Thus, the reduced oversampling offset can help in balancing the feedback overhead on TPMI parameters. Further, imposing beam restrictions that govern the relationships between the beams of different layers can further reduce the precoder possibilities.

According to aspects of the disclosure, a DFT beam can be defined as $$v_i = v_{i_h}^{(H)} \otimes v_{i_v}^{(V)},$$

where ⊗ represents Kronecker product, $$v_{i_h}^{(H)} \text{ and } v_{i_v}^{(V)}$$

represent horizontal beam and vertical beam, respectively, and can be expressed as $$v_{i_h}^{(H)} = \begin{pmatrix} 1 \\ \exp^{j\frac{2\pi i_h}{O_1 N_1}} \\ \exp^{j\frac{2\pi i_h 2}{O_1 N_1}} \\ \vdots \\ \exp^{j\frac{2\pi i_h (N_1-1)}{O_1 N_1}} \end{pmatrix} v_{i_v}^{(V)} = \begin{pmatrix} 1 \\ \exp^{j\frac{2\pi i_v}{O_2 N_2}} \\ \exp^{j\frac{2\pi i_v 2}{O_2 N_2}} \\ \vdots \\ \exp^{j\frac{2\pi i_v (N_2-1)}{O_2 N_2}} \end{pmatrix}$$

In an embodiment, for a 4×1 antenna array (i.e., $N_1=4$ and $N_2=1$) in fully coherent mode, if the beams are oversampled in an azimuth plane of an antenna gain pattern of the 4×1 antenna array, and the oversampling factors $O_1=1$ and $O_2=1$, the possible beams can be given by $$v_i \in \{\underbrace{\begin{pmatrix}1\\1\\1\\1\end{pmatrix}, \begin{pmatrix}1\\j\\-1\\-j\end{pmatrix}, \begin{pmatrix}1\\-1\\1\\-1\end{pmatrix}, \begin{pmatrix}1\\-j\\-1\\j\end{pmatrix}}_{\beta_4^0}\}$$

Figure 3:
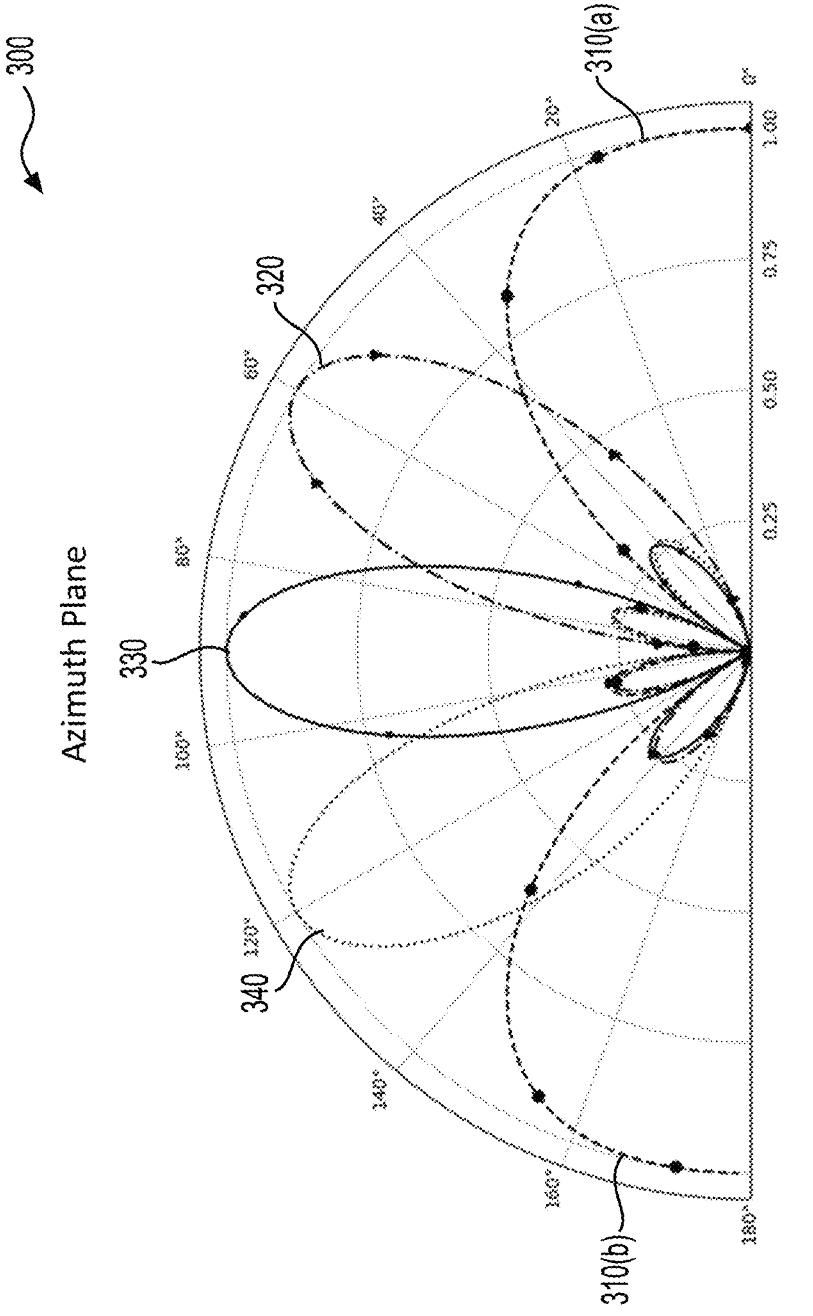
FIG. 3 shows an azimuth plane of an antenna gain pattern for a 4×1 antenna array in fully coherent mode with oversampling factors $O_1=1$ and $O_2=1$.

FIG. 3 shows an azimuth plane 300 of an antenna gain pattern for a 4×1 antenna array in fully coherent mode with oversampling factors $O_1=1$ and $O_2=1$. Thus, the oversampling offset factors $q_1=q_2=0$. In the azimuth plane 300, there are four beams 310-340, where 310(*a*) and 310(*b*) are half beams of the beam 310.

In an embodiment, for a 4×1 antenna array (i.e., $N_1=4$ and $N_2=1$) in fully coherent mode, if the beams are oversampled in an azimuth plane of an antenna gain pattern of the 4×1 antenna array, and the oversampling factors $O_1=2$ and $O_2=1$, the possible beams can be given by $$v_i \in \left\{\underbrace{\begin{pmatrix}1\\1\\1\\1\end{pmatrix}, \begin{pmatrix}1\\j\\-1\\-j\end{pmatrix}, \begin{pmatrix}1\\-1\\1\\-1\end{pmatrix}, \begin{pmatrix}1\\-j\\-1\\j\end{pmatrix}}_{\beta_4^0}, \underbrace{\begin{pmatrix}1\\ \frac{1}{\sqrt{2}}(1+j)\\ j\\ \frac{1}{\sqrt{2}}(-1+j)\end{pmatrix}, \begin{pmatrix}1\\ \frac{1}{\sqrt{2}}(-1+j)\\ -j\\ \frac{1}{\sqrt{2}}(1+j)\end{pmatrix}, \begin{pmatrix}1\\ \frac{1}{\sqrt{2}}(-1-j)\\ j\\ \frac{1}{\sqrt{2}}(1-j)\end{pmatrix}, \begin{pmatrix}1\\ \frac{1}{\sqrt{2}}(1-j)\\ -j\\ \frac{1}{\sqrt{2}}(-1-j)\end{pmatrix}}_{\beta_4^1}\right\}$$

Figure 4:
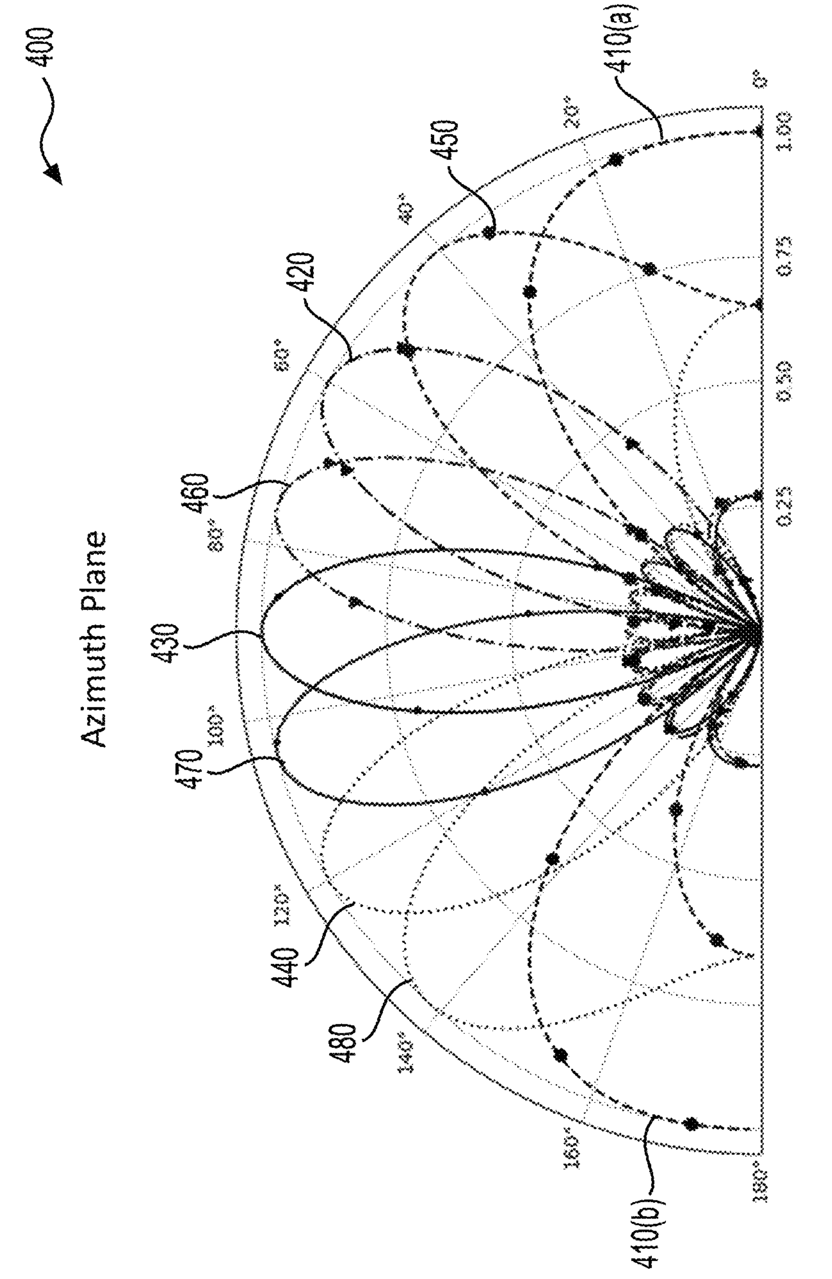
FIG. 4 shows an azimuth plane of an antenna gain pattern for a 4×1 antenna array in fully coherent mode with oversampling factors $O_1=2$ and $O_2=1$.

FIG. 4 shows an azimuth plane 400 of an antenna gain pattern for a 4×1 antenna array in fully coherent mode with oversampling factors $O_1=2$ and $O_2=1$. Thus, the oversampling offset factors $q_1 \in \{0, 1\}$ and $q_2=0$. In the azimuth plane 400, four beams 410-440 are for the oversampling offset factor $q_1=0$, and other four beams 450-480 are for the oversampling factor $q_1=1$, where 410(*a*) and 410(*b*) are half beams of the beam 410.

In an embodiment, for a 2×2 antenna array (i.e., $N_1=2$ and $N_2=2$) in fully coherent mode, if the beams are oversampled in both an azimuth plane and an elevation plane of an antenna gain pattern of the 2×2 antenna array, and the oversampling factors $O_1=2$ and $O_2=2$, the possible beams can be given by $$v_i \in \left\{\underbrace{\begin{pmatrix}1\\1\\1\\1\end{pmatrix}, \begin{pmatrix}1\\-1\\1\\-1\end{pmatrix}, \begin{pmatrix}1\\1\\-1\\-1\end{pmatrix}, \begin{pmatrix}1\\-1\\-1\\1\end{pmatrix}}_{\beta_{2,2}^{0,0}}, \underbrace{\begin{pmatrix}1\\j\\1\\j\end{pmatrix}, \begin{pmatrix}1\\-j\\1\\-j\end{pmatrix}, \begin{pmatrix}1\\j\\-1\\-j\end{pmatrix}, \begin{pmatrix}1\\-j\\-1\\j\end{pmatrix}}_{\beta_{2,2}^{0,1}}, \underbrace{\begin{pmatrix}1\\1\\j\\j\end{pmatrix}, \begin{pmatrix}1\\-1\\j\\-j\end{pmatrix}, \begin{pmatrix}1\\1\\-j\\-j\end{pmatrix}, \begin{pmatrix}1\\-1\\-j\\j\end{pmatrix}}_{\beta_{2,2}^{1,0}}, \underbrace{\begin{pmatrix}1\\j\\j\\-1\end{pmatrix}, \begin{pmatrix}1\\-j\\j\\1\end{pmatrix}, \begin{pmatrix}1\\j\\-j\\1\end{pmatrix}, \begin{pmatrix}1\\-j\\-j\\-1\end{pmatrix}}_{\beta_{2,2}^{1,1}}\right\}$$

Figure 5A:
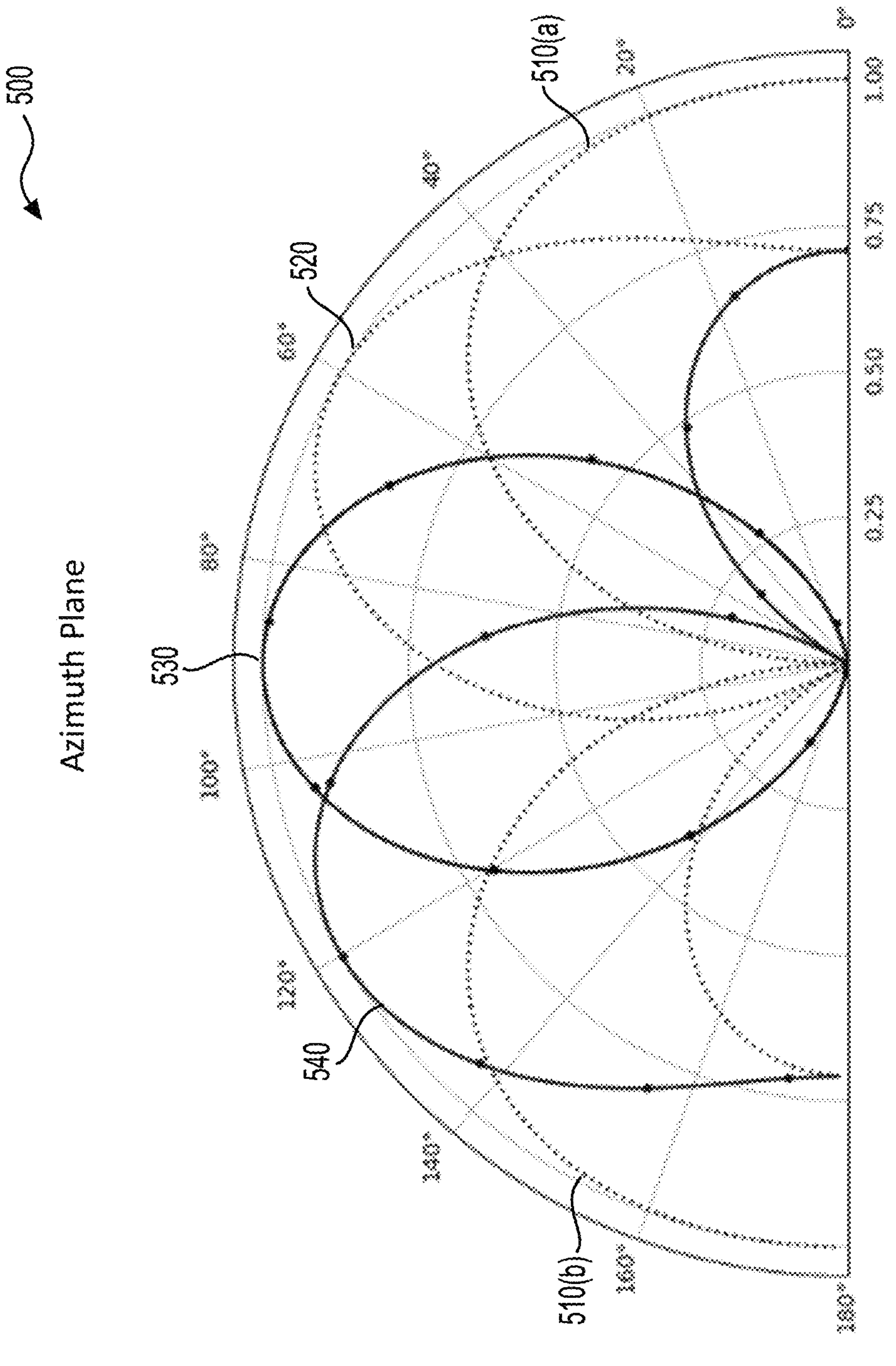
FIGS. 5A and 5B show an azimuth plane and an elevation plane of an antenna gain pattern for a 2×2 antenna array in fully coherent mode with oversampling factors $O_1=2$ and $O_2=2$.
Figure 5B:
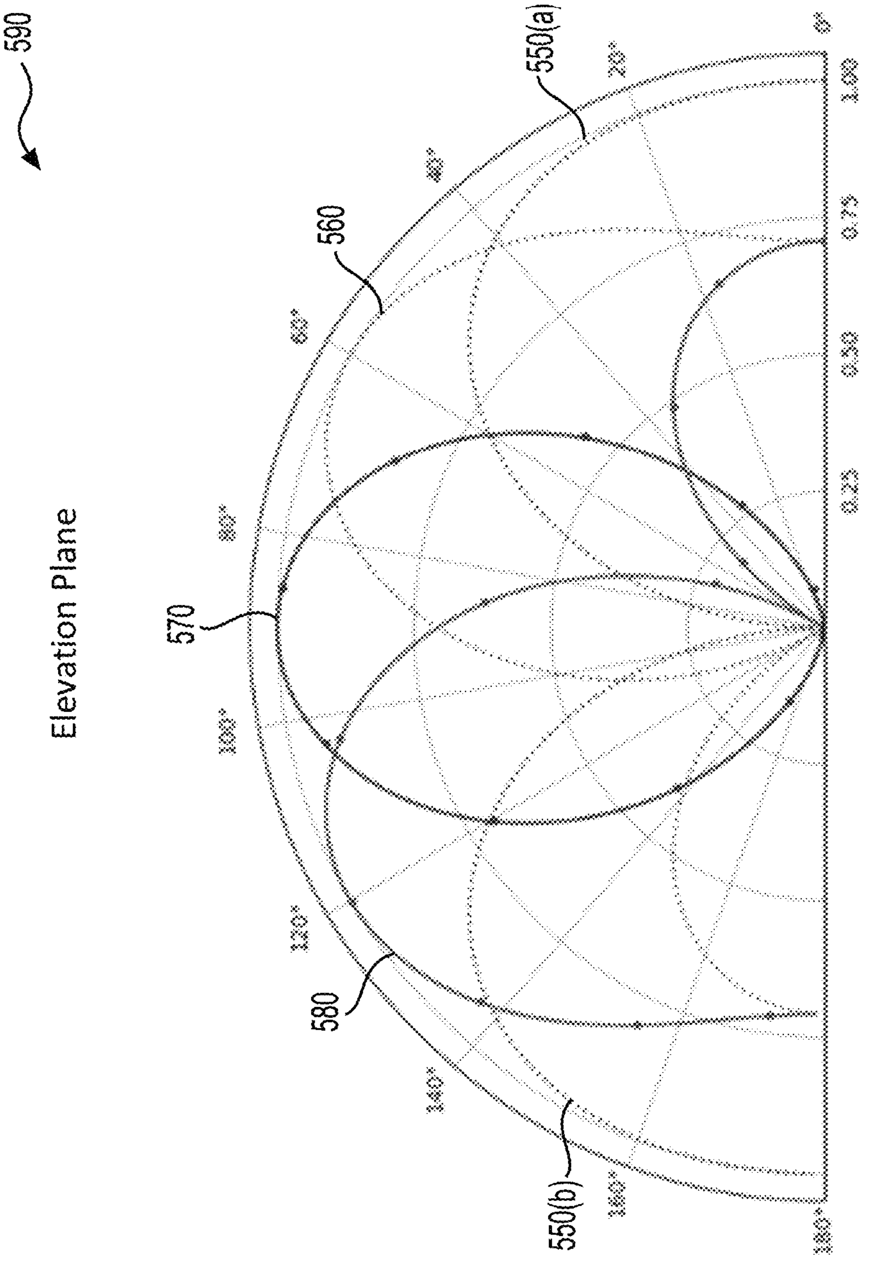

FIGS. 5A and 5B show an azimuth plane 500 and an elevation plane 590 of an antenna gain pattern for a 2×2 antenna array in fully coherent mode with oversampling factors $O_1=2$ and $O_2=2$. Thus, both the oversampling offset factors $q_1$ and $q_2 \in \{0, 1\}$. In the azimuth plane 500, two beams 510 and 530 are for the oversampling offset factor $q_1=0$, where 510(*a*) and 510(*b*) are half beams of the beam 510, and other two beams 520 and 540 are for the oversampling offset factor $q_1=1$. In the elevation plane 590, two beams 550 and 570 are for the oversampling factor $q_2=0$, where 550(*a*) and 550(*b*) are half beams of the beam 550, and other two beams 560 and 580 are for the oversampling factor $q_2=1$.

According to aspects of the disclosure, for a 4×1 antenna array (i.e., $N_1=4$ and $N_2=1$) in fully coherent mode with oversampling factors $O_1=2$ and $O_2=1$, a number of beams $v_i$ is 2×4×1=8. For one-layer transmission, a precoder matrix can be expressed as $$W = \begin{pmatrix} v_1 \\ e^{j\Phi_1} v_1 \end{pmatrix},$$

where the co-phasing values $$\Phi_1 \in \left\{0, \frac{\pi}{2}, \pi, \frac{3\pi}{2}\right\}.$$

Accordingly, a number of precoder choices can be 8×4 (8 beams×4 phases)=32. For two-layer transmission, a precoder matrix can be expressed as $$W=\begin{pmatrix} v_1 & v_2 \\ e^{j\Phi_1}v_1 & e^{j\Phi_2}v_2 \end{pmatrix},$$

and a number of precoder choices can be 32×(32-1)=992, where 32 represents the number of choices for layer 1 and (32-1) represents the number of choices for layer 2. Accordingly, the number of precoder choices for two-layer transmission and above should be reduced.

In an embodiment, the number of precoder choices for two-layer transmission can be reduced by setting $v_1=v_2$ and $\phi_2=\phi_1+\pi$, where $$\Phi_1 \in \left\{0, \frac{\pi}{2}\right\}.$$

Under this limitation, the precoder matrix can be expressed as $$W=\begin{pmatrix} v_1 & v_1 \\ e^{j\Phi_1}v_1 & -e^{j\Phi_1}v_1 \end{pmatrix},$$

and thus the number of precoder choices for two-layer transmission can be reduced to 8×2=16, where 8 and 2 represent the number of choices for $v_1$ and $\Phi_1$, respectively.

In an embodiment, the number of precoder choices for two-layer transmission can be reduced by setting $v_2$ to be one of two adjacent beams of $v_1$ and $\phi_2=\phi_1+\pi$, where $$\Phi_1 \in \left\{0, \frac{\pi}{2}\right\}.$$

Under this limitation, the precoder matrix can be expressed as $$W=\begin{pmatrix} v_1 & v_2 \\ e^{j\Phi_1}v_1 & -e^{j\Phi_1}v_2 \end{pmatrix},$$

and thus the number of precoder choices for two-layer transmission can be reduced to 8×2×2=32, where 8, 2, and 2 represent the number of choices for $v_1$, $v_2$, and $\Phi_1$, respectively.

In an embodiment, for three-layer transmission, the oversampling factors are limited as $O_1=1$ and $O_2=1$, the beams are limited as $v_1=v_3$, and the co-phasing values $\phi_2=\phi_1$, $\phi_3=\phi_1+\pi$, where $$\Phi_1 \in \left\{0, \frac{\pi}{2}\right\}.$$

Under this limitation, the precoder matrix can be expressed as $$W=\begin{pmatrix} v_1 & v_2 & v_1 \\ e^{j\Phi_1}v_1 & e^{j\Phi_1}v_2 & -e^{j\Phi_1}v_1 \end{pmatrix},$$

and thus the number od precoder choices for three-layer transmission can be reduced to 4×3×2=24, where 4, 3, and 2 represent the number of choices for $v_1$, $v_2$, and $\Phi_1$, respectively.

In an embodiment, for four-layer transmission, the oversampling factors are limited as $O_1=1$ and $O_2=1$, the beams are limited as $v_1=v_3$, $v_2=4$, and the co-phasing values $\phi_2=\phi_1$, $\phi_3=\phi_4=\phi_1+\pi$, where $$\Phi_1 \in \left\{0, \frac{\pi}{2}\right\}.$$

Under this limitation, the precoder matrix can be expressed as $$W=\begin{pmatrix} v_1 & v_2 & v_1 & v_2 \\ e^{j\Phi_1}v_1 & e^{j\Phi_1}v_2 & -e^{j\Phi_1}v_1 & -e^{j\Phi_1}v_2 \end{pmatrix},$$

and thus the number of precoder choices for three-layer transmission can be reduced to 4×3×2=24, where 4, 3, and 2 represent the number of choices for $v_1$, $v_2$, and $\Phi_1$, respectively.

Figure 6:
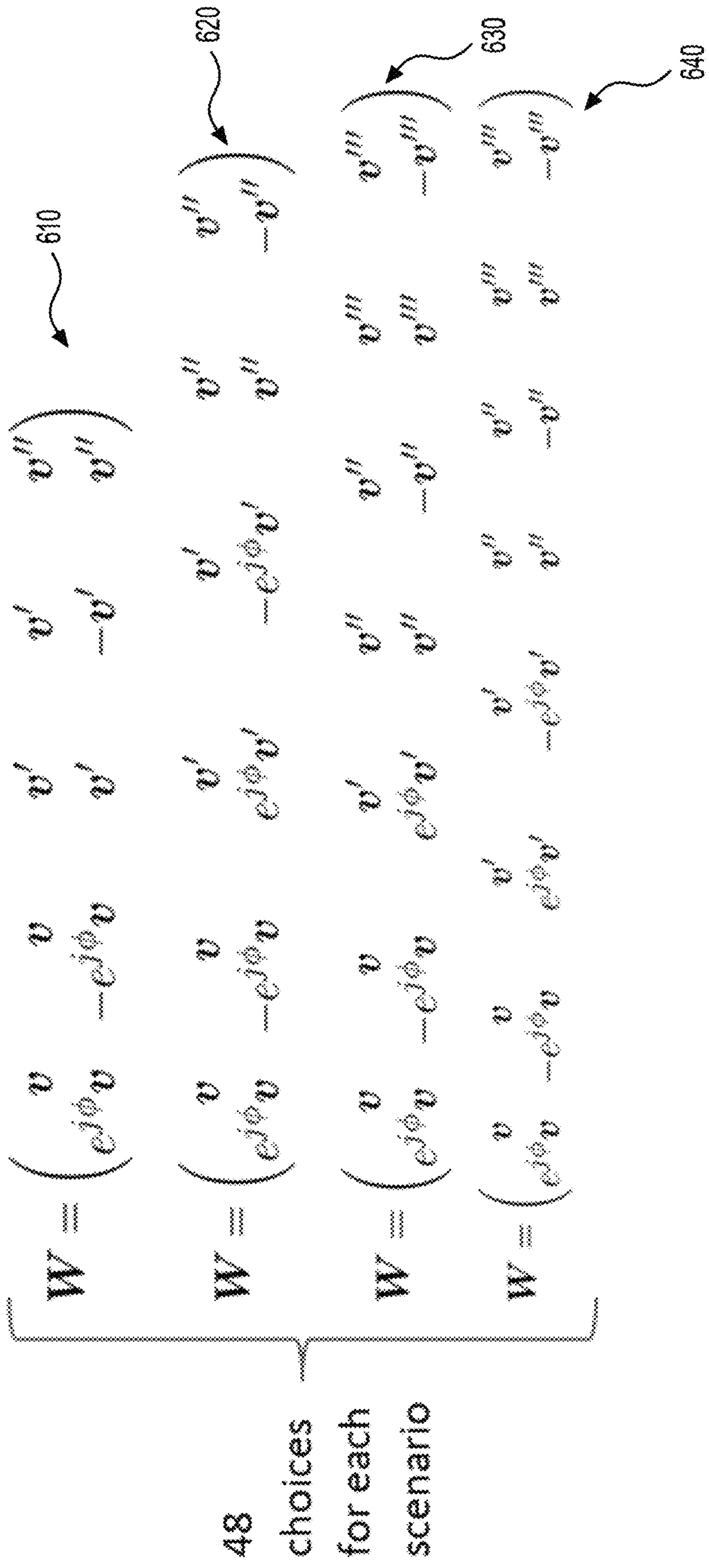
FIG. 6 shows precoder matrices for five-layer to eight-layer transmission with oversampling factors $O_1=1$ and $O_2=1$ and co-phasing values $$\Phi_i \in \left\{0, \frac{\pi}{2}\right\};$$

In an embodiment, for five-layer to eight-layer transmission, the oversampling factors are limited as $O_1=1$ and $O_2=1$, the co-phasing values $$\Phi_i \in \left\{0, \frac{\pi}{2}\right\},$$

and the precoder matrices are shown in FIG. 6, in which the matrices 610-640 represent five-layer, six-layer, seven-layer, and eight-layer precoder matrices, respectively. Accordingly, the number of precoder choices for each scenario can be reduced to 4×3×2×2=48, where 4, 3, 2, and 2 represent the number of choices for v, v', v'', and Φ, respectively.

It is noted that although the precoder matrices in the above embodiments are used for the 4×1 antenna array in fully coherent mode, precoder matrices for other antenna configurations can be obtained in a similar way.

UL Codebooks for Partially Coherent Mode

According to aspects of the disclosure, different subsets of antenna ports of a UE in partially coherent mode are not coherent, while the antenna ports in each subset can be coherent. Accordingly, the antenna ports of the UE in partially coherent mode can be divided into multiple groups, where the antenna ports within each group are coherent, and the antenna ports from different groups are not coherent.

In an embodiment, the antenna ports can be divided into groups of equal size M. For example, 8 TX antenna ports can be divided into two groups with each group including four antenna ports (M=4), or into four groups with each group including two antenna ports (M=2). Each group of antenna ports can be used to transmit $L_M$ layers, where $L_M \leq M$.

According to aspects of the disclosure, to construct precoder matrices to support partially coherent antenna ports, a procedure can be defined as follows.

First, one of the multiple groups of antenna ports is selected to be considered, and layers to be transmitted by the selected antenna group are identified. Then, within columns in a precoder matrix corresponding to the identified layers, all elements that belong to TX antenna ports outside of the selected antenna group are zero-out. The remaining elements constitute an $M \times L_M$ submatrix. Further, an $L_M$-layer precoder from an M-TX coherent codebook can be used to fill out the elements of the $M \times L_M$ submatrix. In an example, the M-TX codebook can be constructed based on the above embodiments provided in the fully coherent mode by considering M TX ports. In an example, the legacy M-TX coherent codebook can be used as the M-TX codebook. Finally, the above steps can be repeated for other antenna groups if available, in a similar way, to transmit the remaining layers, if the total number of layers is greater than $L_M$.

Figure 7:
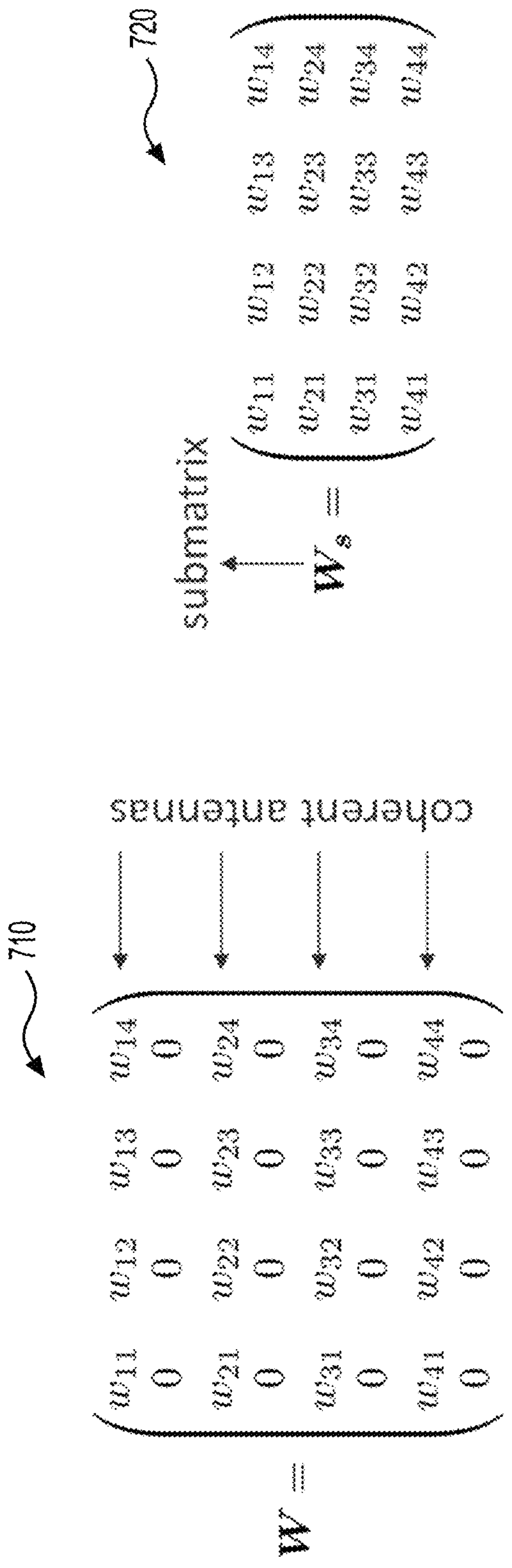
FIG. 7 shows an example of constructing a precoder matrix to support partially coherent antenna ports according to embodiments of the disclosure.

FIG. 7 shows an example of constructing a precoder matrix to support partially coherent antenna ports according to embodiments of the disclosure. In FIG. 7, a four-layer precoder matrix W 710 is for a 4×1 antenna array in partially coherent mode, in which odd rows and even rows represent different antenna groups (M=4). Thus, the antenna ports in the odd rows are coherent to each other, the antenna ports in even rows are coherent to each other, while the antenna ports in the odd rows and the antenna ports in the even rows are not coherent to each other. First, the antenna ports in the even rows are selected. Then, elements in the odd rows can be zero-out, and elements in the even rows can constitute a 4×4 submatrix $W_S$ 720. Further, a 4-layer precoder from a 4-TX coherent codebook can be used to fill out the elements of the 4×4 submatrix $W_S$ 720. After filling out the submatrix $W_S$ 720, the antenna ports in the odd rows can be processed in a similar way.

Figure 8:
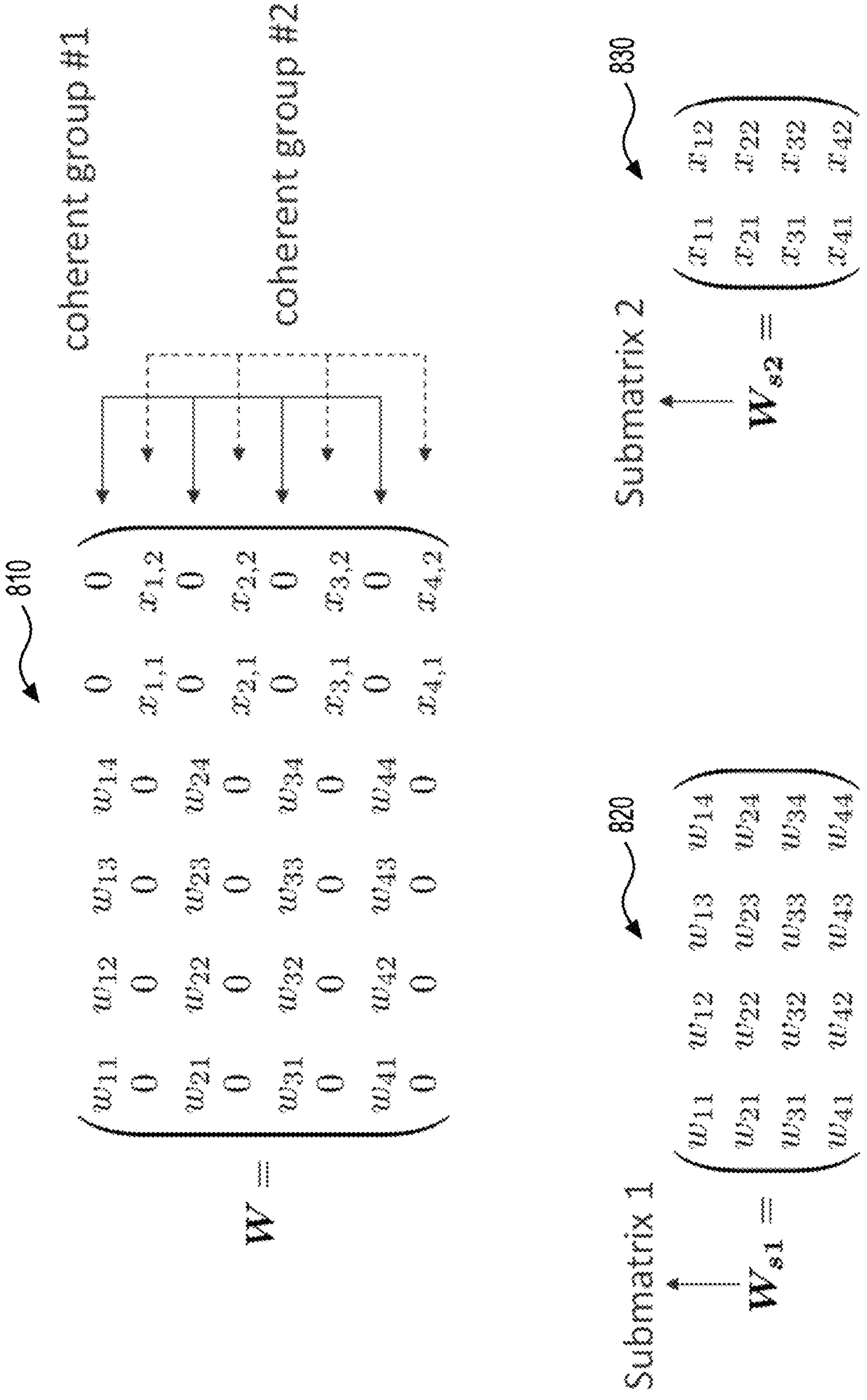
FIG. 8 shows another example of constructing a precoder matrix to support partially coherent antenna ports according to embodiments of the disclosure.

FIG. 8 shows another example of constructing a precoder matrix to support partially coherent antenna ports according to embodiments of the disclosure. In FIG. 8, a six-layer precoder matrix W 810 is for a 4×1 antenna array in partially coherent mode, in which odd rows and even rows represent different antenna groups (M=4). The antenna group corresponding to the even rows transmits the first four layers and the antenna group corresponding to the odd rows transmits the last two layers. The elements in the even rows of the first four layers can constitute a 4×4 submatrix $W_{S1}$ 820, and the elements in the odd rows of the last two layers can constitute a 4×2 submatrix $W_{S2}$ 830. Further, a 4-layer precoder from a 4-TX coherent codebook can be used to fill out the elements of the 4×4 submatrix $W_{S1}$ 820, and a 2-layer precoder from a 4-TX coherent codebook can be used to fill out the elements of the 4×2 submatrix $W_{S2}$ 830. Different W can be constructed from combinations of $W_{s1}$ and $W_{s2}$.

UL Codebooks for Non-Coherent Mode

According to aspects of the disclosure, for a UE in non-coherent mode, antenna ports of the UE are selected based on a number of layers transmission. Only one antenna can be used to transmit one layer. When L layers exists, a total of $$\binom{M}{L}$$

precoder matrices can be constructed, where M is the number of antenna ports.

Figure 9:
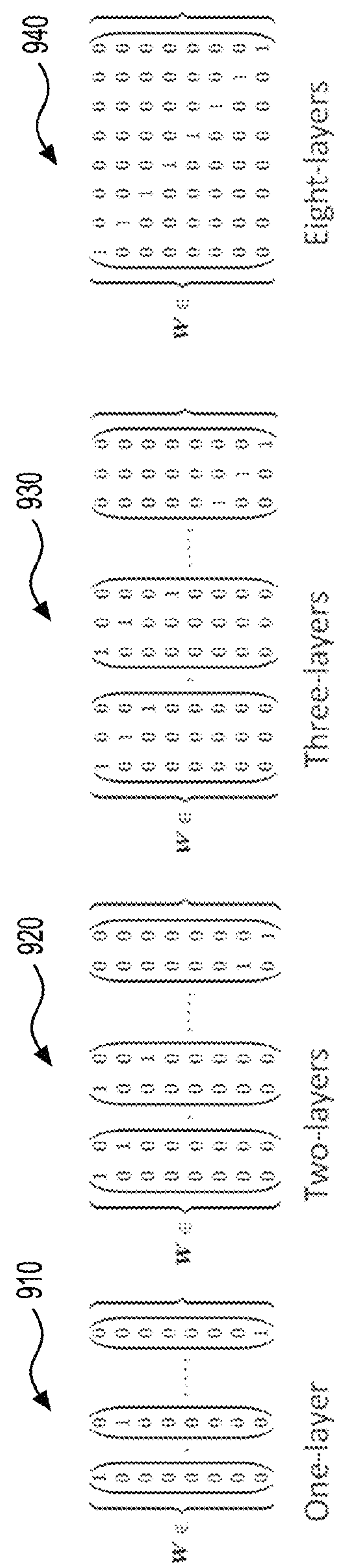
FIG. 9 shows exemplary precoder matrices for an antenna array with 8-TX antenna ports in non-coherent mode according to embodiments of the disclosure.

FIG. 9 shows exemplary precoder matrices for an antenna array with 8-TX antenna ports in non-coherent mode according to embodiments of the disclosure. In FIG. 9, one-layer precoder 910 includes $$\binom{8}{1} = 8$$

precoder matrices, two-layer precoder 920 includes $$\binom{8}{2} = 28$$

precoder matrices, three-layer precoder 930 includes $$\binom{8}{3} = 56$$

precoder matrices, and eight-layer precoder 940 includes $$\binom{8}{8} = 1$$

precoder matrix. In addition, out of all $$\binom{8}{L}$$

possible matrices, a subset of the precoder matrices can be chosen to limit the overhead and optimize the performance.

Flowchart

This disclosure provides UL precoder matrices for more than 4 TX ports, where columns of the precoder matrices are co-phased DFT beams. Accordingly, TPMI can be specified using beam and phase indices. Both beam and phase choices can take value from predetermined sets. Such sets can be rank-dependent to balance between the system performance and the overhead level.

The beam sets (and precoder matrices) can be expressed using mathematical equations to avoid listing all codebook entries in tabular format. The beam sets for different ranks can have different oversampling factors. Precoders for partially coherent mode can be determined based on the precoders (or a subset of the precoders with an appropriate size) for UL fully coherent mode.

Figure 10:
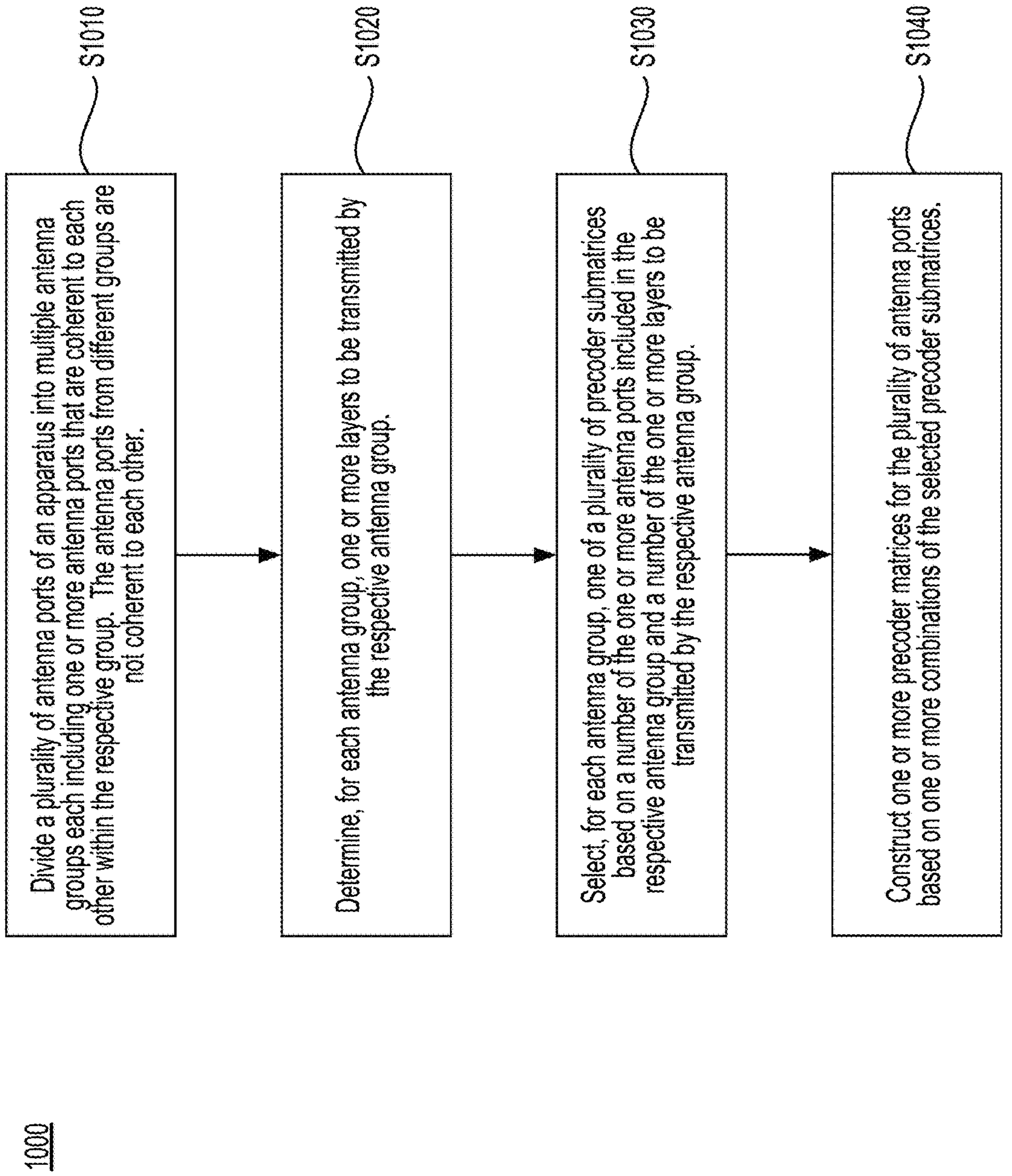
FIG. 10 shows a flowchart outlining a process according to embodiments of the disclosure.

FIG. 10 shows a flowchart outlining a process 1000 according to embodiments of the disclosure. The process 1000 can be executed by the processing circuitry 1110 of the apparatus 1100. The process 1000 may start at step S1010.

At step S1010, the process 1000 divides a plurality of antenna ports of the apparatus into multiple antenna groups each including one or more antenna ports that are coherent to each other within the respective group. The antenna ports from different groups are not coherent to each other. Then, the process 1000 proceeds to step S1020.

At step S1020, the process 1000 determines, for each antenna group, one or more layers to be transmitted by the respective antenna group. Then, the process 1000 proceeds to step S1030.

At step S1030, the process 1000 selects one of a plurality of precoder submatrices based on a number of the one or more antenna ports included in the respective antenna group and a number of the one or more layers to be transmitted by the respective antenna group. Then, the process 1000 proceeds to step S1040.

At step S1040, the process 1000 constructs one or more precoder matrices for the plurality of antenna ports based on one or more combinations of the selected precoder submatrices. Then, the process 1000 terminates.

In an embodiment, a number of rows of each selected precoder submatrix corresponds to the number of the one or more antenna ports included in the antenna group corresponding to the respective selected precoder submatrix.

In an embodiment, a number of columns of each selected precoder submatrix corresponds to the number of the one or more layers to be transmitted by the antenna group corresponding to the respective selected precoder submatrix.

In an embodiment, columns of each of the plurality of precoder submatrices are discrete Fourier transform (DFT) beams.

In an embodiment, each DFT beam is a Kronecker product of a horizontal beam and a vertical beam.

In an embodiment, the DFT beams in each column are co-phased within the respective column.

In an embodiment, a first subset and a second subset of the plurality of precoder submatrices correspond to a first number of layers and a second number of layers. In an example, the first number is not equal to the second number. In an example, the first number is equal to the second number.

In an embodiment, a first oversampling factor and a second oversampling factor are used for the first subset and the second subset of the plurality of precoder matrices, respectively. In an example, the first oversampling factor is not equal to the second oversampling factor. In an example, the first oversampling factor is equal to the second oversampling factor.

In an embodiment, a first DFT beam and a second DFT beam respectively corresponding to a first column and a second column of one of the plurality of precoder submatrices are adjacent beams.

In an embodiment, the process 1000 generates channel state information based on one of the one or more constructed precoder matrices.

System Architecture

Figure 11:
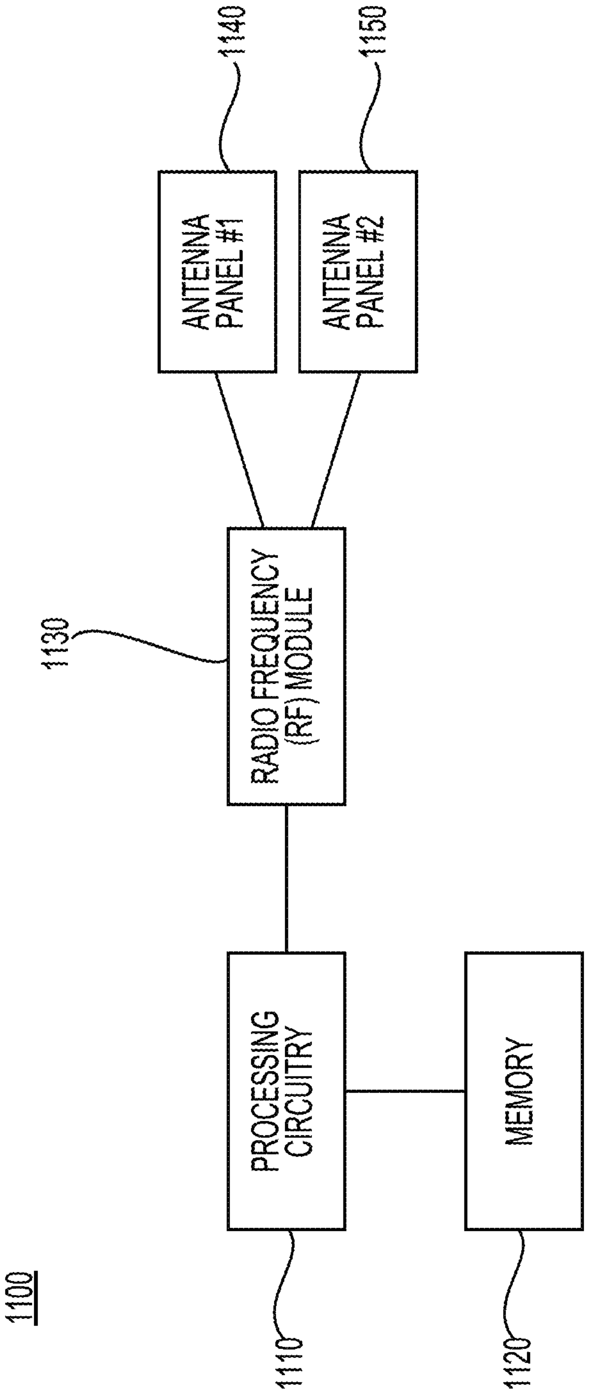
FIG. 11 shows an exemplary apparatus according to embodiments of the disclosure.

FIG. 11 shows an exemplary apparatus 1100 according to embodiments of the disclosure.

The apparatus 1100 can be configured to perform various functions in accordance with one or more embodiments or examples described herein. Thus, the apparatus 1100 can provide means for implementation of techniques, processes, functions, components, systems described herein. For example, the apparatus 1100 can be used to implement functions of a UE or a base station (BS) (e.g., gNB) in various embodiments and examples described herein. The apparatus 1100 can include a general-purpose processor or specially designed circuits to implement various functions, components, or processes described herein in various embodiments. The apparatus 1100 can include processing circuitry 1110, a memory 1120, a radio frequency (RF) module 1130, and two antenna panels 1140 and 1150.

In various examples, the processing circuitry 1110 can include circuitry configured to perform the functions and processes described herein in combination with software or without software. In various examples, the processing circuitry 1110 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1110 can be a central processing unit (CPU) configured to execute program instructions to perform various functions and processes described herein. Accordingly, the memory 1120 can be configured to store program instructions. The processing circuitry 1110, when executing the program instructions, can perform the functions and processes. The memory 1120 can further store other programs or data, such as operating systems, application programs, and the like. The memory 1120 can include a read only memory (ROM), a random-access memory (RAM), a flash memory, a solid state memory, a hard disk drive, an optical disk drive, and the like.

The RF module 1130 receives a processed data signal from the processing circuitry 1110 and converts the data signal to beamforming wireless signals that are then transmitted via the antenna panels 1140 and/or 1150, or vice versa. The RF module 1130 can include a digital to analog convertor (DAC), an analog to digital converter (ADC), a frequency up convertor, a frequency down converter, filters and amplifiers for reception and transmission operations. The RF module 1130 can include multi-antenna circuitry for beamforming operations. For example, the multi-antenna circuitry can include an uplink spatial filter circuit, and a downlink spatial filter circuit for shifting analog signal phases or scaling analog signal amplitudes. Each of the antenna panels 1140 and 1150 can include one or more antenna arrays.

In an embodiment, part of all the antenna panels 1140/1150 and part or all functions of the RF module 1130 are implemented as one or more TRPs (transmission and reception points), and the remaining functions of the apparatus 1100 are implemented as a BS. Accordingly, the TRPs can be co-located with such a BS, or can be deployed away from the BS.

The apparatus 1100 can optionally include other components, such as input and output devices, additional or signal processing circuitry, and the like. Accordingly, the apparatus 1100 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random-access memory (RAM), a read-only memory (ROM), a magnetic disk and an optical disk, and the like. The computer-readable non-transitory storage medium can include all types of computer readable medium, including magnetic storage medium, optical storage medium, flash medium, and solid-state storage medium.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C. Specifically, combinations such as “at least one of A, B, or C,” “one or more of A, B, or C,” “at least one of A, B, and C,” “one or more of A, B, and C,” and “A, B, C, or any combination thereof” may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

What is claimed is:

1. A method for wireless communication at an apparatus, comprising:

dividing a plurality of antenna ports of the apparatus into multiple antenna groups each including one or more antenna ports that are coherent to each other within the respective group, the antenna ports from different groups not being coherent to each other;

determining, for each antenna group, one or more layers to be transmitted by the respective antenna group;

selecting, for each antenna group, one of a plurality of precoder submatrices based on a number of the one or more antenna ports included in the respective antenna group and a number of the one or more layers to be transmitted by the respective antenna group;

constructing one or more precoder matrices for the plurality of antenna ports based on one or more combinations of the selected precoder submatrices; and generating channel state information based on one of the one or more constructed precoder matrices.

2. The method of claim 1, wherein a number of rows of each selected precoder submatrix corresponds to the number of the one or more antenna ports included in the antenna group corresponding to the respective selected precoder submatrix.

3. The method of claim 1, wherein a number of columns of each selected precoder submatrix corresponds to the number of the one or more layers to be transmitted by the antenna group corresponding to the respective selected precoder submatrix.

4. The method of claim 1, wherein columns of each of the plurality of precoder submatrices are discrete Fourier transform (DFT) beams.

5. The method of claim 4, wherein each DFT beam is a Kronecker product of a horizontal beam and a vertical beam.

6. The method of claim 4, wherein the DFT beams in each column are co-phased within the respective column.

7. The method of claim 4, wherein a first subset and a second subset of the plurality of precoder submatrices correspond to a first number of layers and a second number of layers, the first number being not equal to the second number.

8. The method of claim 7, wherein a first oversampling factor and a second oversampling factor are used for the first subset and the second subset of the plurality of precoder matrices, respectively, the first oversampling factor being not equal to the second oversampling factor.

9. The method of claim 4, wherein a first DFT beam and a second DFT beam respectively corresponding to a first column and a second column of one of the plurality of precoder submatrices are adjacent beams.

10. An apparatus, comprising processing circuitry configured to:

divide a plurality of antenna ports of the apparatus into multiple antenna groups each including one or more antenna ports that are coherent to each other within the respective group, the antenna ports from different groups not being coherent to each other;

determine, for each antenna group, one or more layers to be transmitted by the respective antenna group;

select, for each antenna group, one of a plurality of precoder submatrices based on a number of the one or more antenna ports included in the respective antenna group and a number of the one or more layers to be transmitted by the respective antenna group;

construct one or more precoder matrices for the plurality of antenna ports based on one or more combinations of the selected precoder submatrices; and generate channel state information based on one of the one or more constructed precoder matrices.

11. The apparatus of claim 10, wherein a number of rows of each selected precoder submatrix corresponds to the number of the one or more antenna ports included in the antenna group corresponding to the respective selected precoder submatrix.

12. The apparatus of claim 10, wherein a number of columns of each selected precoder submatrix corresponds to the number of the one or more layers to be transmitted by the antenna group corresponding to the respective selected precoder submatrix.

13. The apparatus of claim 10, wherein columns of each of the plurality of precoder submatrices are discrete Fourier transform (DFT) beams.

14. The apparatus of claim 13, wherein each DFT beam is a Kronecker product of a horizontal beam and a vertical beam.

15. The apparatus of claim 13, wherein the DFT beams in each column are co- phased within the respective column.

16. The apparatus of claim 13, wherein a first subset and a second subset of the plurality of precoder submatrices correspond to a first number of layers and a second number of layers, the first number being not equal to the second number.

17. The apparatus of claim 16, wherein a first oversampling factor and a second oversampling factor are used for the first subset and the second subset of the plurality of precoder matrices, respectively, the first oversampling factor being not equal to the second oversampling factor.

18. The apparatus of claim 13, wherein a first DFT beam and a second DFT beam respectively corresponding to a first column and a second column of one of the plurality of precoder submatrices are adjacent beams.

* * * * *